(No Model.)
A. J. REYNOLDS.
STREET SWEEPER.
No. 348,778. Patented Sept. 7, 1886.
FIG. I.
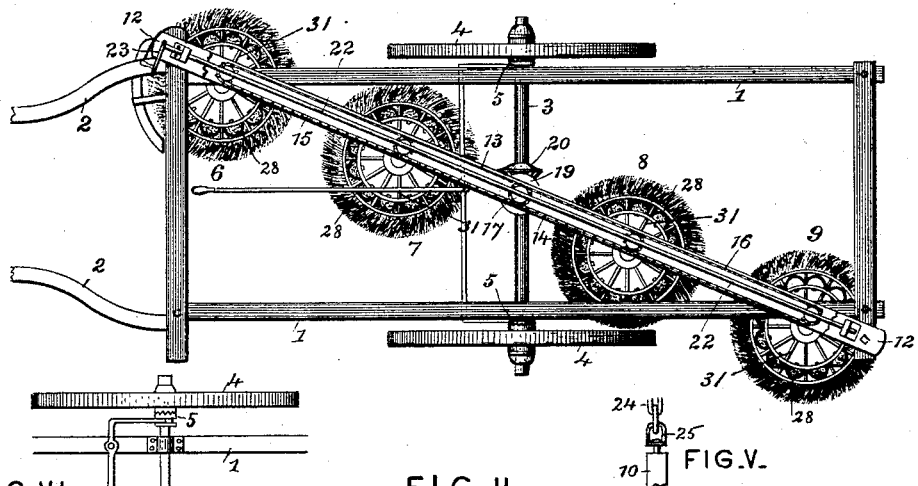
FIG. VI. FIG. II. FIG. V.
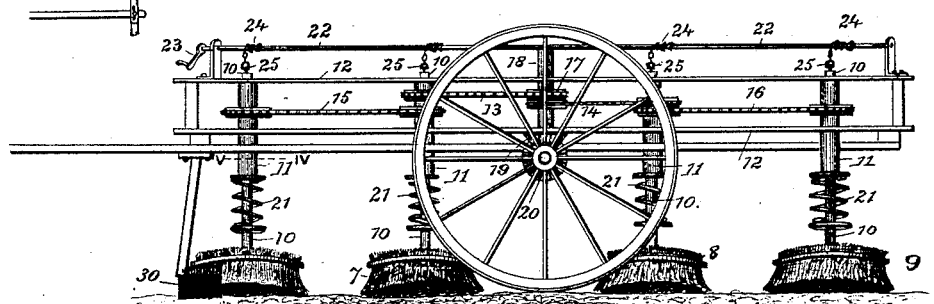
FIG. III. FIG. IV.
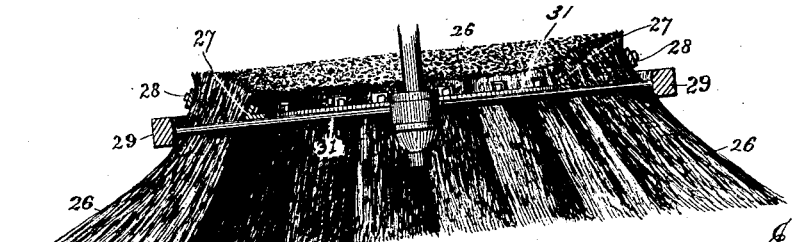
Attest:
Geo. T. Smallwood,
Jas. K. McCathran.
Inventor
Andrew J. Reynolds.
By Knight Bros
attys

UNITED STATES PATENT OFFICE.

ANDREW JACKSON REYNOLDS, OF CHICAGO, ILLINOIS.

STREET-SWEEPER.

SPECIFICATION forming part of Letters Patent No. 348,778, dated September 7, 1886.

Application filed February 27, 1885. Serial No. 157,223. (No model.)

*To all whom it may concern:*

Be it known that I, ANDREW JACKSON REYNOLDS, a citizen of the United States, residing at Chicago, in the county of Cook and State of Illinois, have invented a new and Improved Vertical Broom Street and Gutter Sweeper, of which the following is a specification.

Street-sweeping machines as heretofore constructed are not well adapted for cobble-stones and rough, broken, or imperfect pavements. For this reason their availability is comparatively limited in extent.

The object of my invention is to produce a mechanical sweeper which will operate with good effect on rough and imperfect pavements as well as on smooth surfaces.

To this end I construct the machine with a series of vertical brushes rotating on axes slightly inclined from the perpendicular, and adapted to remove dirt from the gutters as well as from cavities and interstices in the pavements, and by the successive action of the brushes to sweep it toward the center of the street, where it may effectively taken up, loaded, and carried away by another machine, which I have described in a separate application for Letters Patent.

The features of novelty which I claim as my invention are hereinafter fully described, and particularly pointed out in the claims.

In the accompanying drawings, Figure I is a plan or top view of a machine, illustrating my present invention. Fig. II is a side elevation of the same. Fig. III is a vertical section of one of the brushes, on a larger sale. Fig. IV is a horizontal section on the line IV IV, Fig. II. Fig. V is an enlarged view of one of the swivels, hereinafter referred to. Fig. VI is a detail view of the clutch and the lever for operating it, viewed from beneath.

1 represents a rectangular frame, having in front shafts 2, or other draft appliances. Said frame has an axle, 3, turning in suitable boxes, and carrying wheels 4, which are so connected with the axle 3, by clutch mechanism 5, as to permit the machine to turn or back freely, and to drive the axle when it is moving forward.

6 7 8 9 represent vertical circular brushes mounted on shafts 10, which are inclined slightly from the perpendicular, so as to depress the advancing side of each brush. The shafts 10 are adapted to slide up and down in sleeves 11 in a diagonal frame, 12, secured to the carrying-frame 1, and are formed with splines or feathers, Fig. IV, to cause them to be rotated by the sleeves 11, which latter are driven by sprocket-chains 13 14 15 16, the central chains, 13 14, passing around a sprocket driving-wheel, 17, on a vertical shaft, 18, which is driven by bevel-pinions 19 20, the latter keyed on the driving-axle 3. It will thus be seen that the brushes 7 and 8 are driven directly by the central chains, 13 14, while the brushes 6 and 9 are driven by the chains 15 and 16 from the driving-sleeves of the central brushes.

Spiral springs 21 are provided to hold the brushes down to their work independently. In order to lift them simultaneously, I employ a shaft, 22, parallel with the diagonal frame 12, rotated by a crank or lever, 23, and connected by chains 24 with swivels 25, on the respective brush-shafts 10.

When the brushes are to be lifted out of contact with the ground, the clutch mechanism 5 is so shifted by means of suitably-arranged levers as to permit the ground-wheels to turn freely upon the axle 3 without imparting rotation thereto. For shifting the sliding sleeve of this clutch I have shown a bell-crank lever pivoted to the under side of the frame, and bifurcated at one end to fit in the groove in said sleeve. The arrangement is duplicated upon the opposite sides of the machine, and both may be operated together from the driver's seat by means of a rod, which engages the inner arms of both bell-crank levers. By throwing the brooms out of engagement, when elevated, it avoids the necessity of lubricating the swivels.

The heads or frames of the brushes are made, as represented in Fig. III, in the form of double-rimmed wheels dished on the under side, the splints 26 being secured to the inner rim, 27, by clips 28, and the outer rim, 29, serving to hold them down to their work. The rims 29 are supported by spokes 31, radiating from the hub or center of the brush, as represented in Figs. I and III. These spokes are equal in number to the bunches or tufts of splints, one being passed between the adjacent faces of each two tufts in such a manner as to afford a bearing therefor, and receive the pressure at a point below the clips 28, thereby lessening the strain on said clips and increasing the rigidity of the tufts.

The brushes may be made of different sizes, the forward one or gutter-broom being the smallest and of the coarsest material, the next one made larger and finer, and so on, the rear brush being larger and of finer material than the others, so as to thoroughly sweep up and remove fine dust and dirt. The rear brush may be driven at a higher velocity than the others, and may be so large in diameter as to extend across the whole width of the machine, so as to sweep over the path of the other brushes. The front brush, 6, which is made to sweep the gutter, projects laterally beyond the carrying-wheel, and may be provided with lateral adjustment, and pressed outward by a horizontal spring to cause it to work in contact with the curbstone, as shown and described in my contemporaneous application, No. 139,682, filed on the 5th day of August, 1884. A suitable fender, 30, is provided for confining the dust and dirt which is thrown forward by the front brush, 6. Otherwise a portion of this dirt would be thrown against the horses' feet and be a source of annoyance. The carrying-frame and diagonal frame, by which these brooms are supported, may also be used on a wagon, car, or other four-wheel vehicle, the brooms being run by gearing on the hind wheels after the method described when using a two-wheel vehicle.

I am aware that it has been proposed to construct a sweeper with a circular broom having an inclined spindle, and with splints projecting downwardly therefrom parallel with said spindle; but such is not the equivalent of my invention.

In order to thoroughly sweep the crevice between the street and the curbstone, it is essential that the splints should project radially. In brooms constructed according to my invention they project beyond the circular frames to which they are secured.

I am also aware that the bristles of paint and similar brushes have been so secured at one end within a flaring or conical socket as to assume a similar shape, and do not claim such as my invention.

Having thus described my invention the following is what I claim as new therein and desire to secure by Letters Patent—

1. In a street-sweeper, the combination, with the ground-wheels and axle and a suitable frame, of an inclined spindle, a circular frame, and downwardly-projecting splints secured thereto, said splints being inclined to the axis of the broom and projecting radially beyond the said frame, substantially as set forth.

2. In a street-sweeper, the combination, with the ground-wheels and axle and a suitable frame, of a series of inclined spindles arranged diagonally across the frame, a circular frame or wheel carried by each of said spindles, and inclined downwardly-projecting splints arranged in annular series upon said circular frames and projecting radially beyond them, substantially in the manner and for the purpose set forth.

3. In a street-sweeper, the combination, with the ground-wheels and axle, a spindle, and a circular frame or ring supported thereby, of an annular series of splints projecting downwardly and radially therefrom and inclined to the axis of the broom, and a second concentric ring surrounding said annular series of splints for holding or pressing them down, as set forth.

4. In a broom, the combination, with a frame and splints secured thereto, of the spokes passing between said splints between their points of attachment and their free extremities, so as to prevent their displacement, as set forth.

5. In a broom, the combination, with the ring 27, the bunches of splints 26, and the clips 28, securing said bunches of splints to said ring, of the radial spokes 31, passing between and bracing said bunches of splints below the plane of the clips 28, and the ring 29, supported by said spokes and surrounding said splints, substantially as set forth.

6. In a street-sweeper, the combination, with the ground-wheels and axle and a suitable frame, of an inclined spindle, a ring or rim supported thereby, and having an inclined outer surface, and the splints secured to said surface so as to project in a direction inclined to the axis of the broom, as set forth.

7. In a broom, the combination of the inner rim, 27, having the inclined outer face, the splints 26, the clips 28, securing said splints to said rim 27, and the rim 29, surrounding said splints, as set forth.

ANDREW JACKSON REYNOLDS.

Witnesses:
JACOB J. SNIDER,
ROBERT CROSBIE.